Dec. 27, 1932.                G. C. PETERSON                 1,892,219
                    MIRROR SUPPORTING AND ADJUSTING DEVICE
                           Filed April 16, 1930
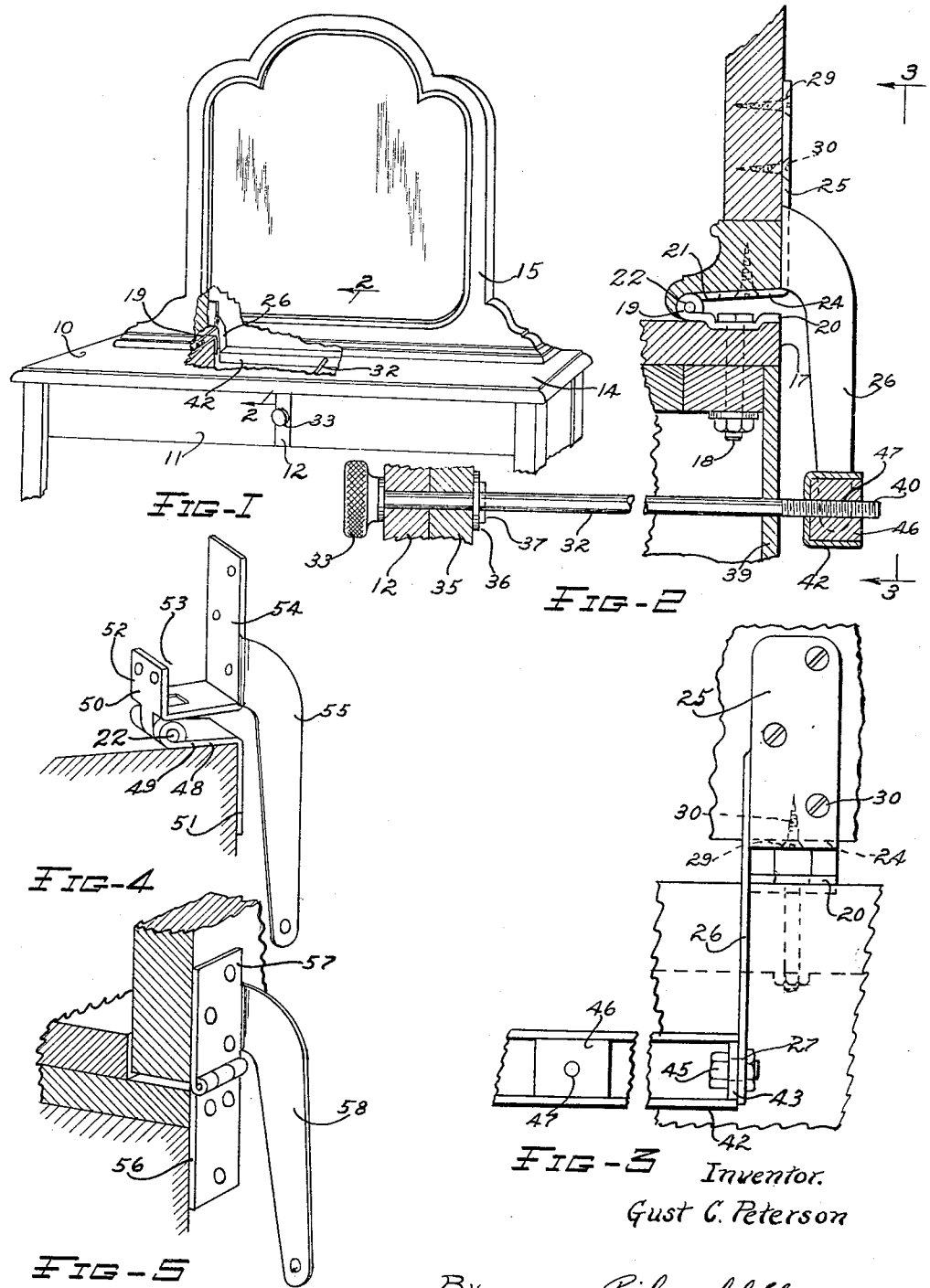
Inventor.
Gust C. Peterson
By Richmond S. Hayes
His Attorney Patented Dec. 27, 1932

1,892,219

UNITED STATES PATENT OFFICE

GUST C. PETERSON, OF JAMESTOWN, NEW YORK

MIRROR SUPPORTING AND ADJUSTING DEVICE

Application filed April 16, 1930. Serial No. 444,734.

This invention relates to a device for supporting a mirror on an article of furniture or the like, and particularly to one having mirror adjusting means in connection therewith.

Prior to this invention, the practise has been to support a mirror through the use of pivot pins mounted in the vertical walls of the mirror frame, the pins in turn being supported by posts or uprights mounted on an article of furniture. With this form of structure it is difficult to produce attractive designs by reason of the necessity of including in such design a pair of spaced uprights by which to support a mirror. Furthermore, structures of this type are known to require constant adjustment to maintain the mirror in a position for use and such adjustment causes wear to the extent that shortly the mirror cannot be held in any desired position but will swing freely on its pivots. As a result, many articles of furniture are now provided with separate wall mirrors which, while overcoming the above difficulties, are not always to be desired in view of the lack of adjustability of the mirror and the inconvenience thus presented. The present invention, however, provides a support which pivotally joins the lower edge of the mirror frame to an article of furniture without the aid of uprights of any kind. The support is comprised of two elements, one of which is engaged with and supports the mirror. This element is also arranged with an arm which, through a suitable mechanism, may be actuated to tilt the mirror forwardly or backwardly as desired.

The principal object of the invention lies in the provision of a pivot mirror support located adjacent the base of the mirror.

Another object of the invention lies in the provision of tilting means by which to adjust a mirror from the front of an article of furniture.

Other and further objects of the invention may be more clearly understood from a consideration of the following specification which is taken in conjunction with the accompanying drawing, and in which Fig. 1 is a perspective view of an article of furniture, parts being broken away to disclose the application of this invention thereto;

Fig. 2 is a greatly enlarged transverse sectional view of one modification of this invention and is taken substantially on the line 2—2 indicated in Figure 1;

Fig. 3 is a rear elevation of the structure shown in Figure 2, being taken substantially as indicated at 3—3 in Figure 2;

Fig. 4 is a perspective view of a slight modification of this invention and shows a pocket in the movable element within which the mirror frame is located; and Fig. 5 is a further and simplified modification of the structures shown in Figures 2 and 4.

Referring to the drawing and particularly to Figs. 1 and 2 thereof, this invention is shown mounted on an article of furniture generally indicated by the reference numeral 10. The article is provided with drawers 11 which are spaced apart by an upright or support 12. Mounted on the top 14 of the article is a mirror frame 15. The frame 15 is adapted to be tilted forwardly or backwardly according to the needs of the user of the article.

Adjacent the rear edge 17 of the top 14 and secured thereto by bolts 18, are fixed elements 20 of supporting members 19. The fixed element 20 is mounted on the top 14 and the movable element 21 is pivotally connected to the fixed element by means of the pin 22. The movable element 21 is formed with a base flange 24 which terminates in a right angle flange 25. Projecting outwardly and downwardly from one side of the flange 25 is an arm 26, the lower end of which is formed with an opening 27. A number of openings 29 are provided in the flanges 24 and 25 through which screws 30 are passed to engage and secure the frame 15 in place upon the movable element 21. It will be noted that the weight of the frame 15 is carried entirely upon the movable elements 21, and, consequently, when the arms 26 are moved toward or away from the article of furniture, the frame 15 will be tilted forwardly or backwardly as the case may be. It is contemplated that not more than two supporting members will be necessary to accommodate the weight of a mirror and frame of ordinary size. However, should it be found desirable to support an unusually large mirror in this fashion, an additional supporting member may be provided and the end supporting members will be formed with the flanges 25 of considerably increased length over those shown in the present modification.

Referring particularly to Figure 2, it will be noted that the upright 12 supports a rod 32, the forward end of which extends beyond said upright. A knob 33 is secured to and adapted to rotate said rod. A block 35 is preferably located to the rear of the upright 12 to create additional bearing surface for the rod 32 which projects therethrough. A washer 36 is mounted on the rod and adjacent said washer an opening in the rod is provided to accommodate a pin 37, the purpose of which is to prevent any but rotary movement of the rod. The inner end of the rod 32 projects through the rear wall 39 of the article and is formed with threads 40. In the present modification, two supporting members 21 and, consequently, two arms 26 are utilized. Between the arms 26 a channel member 42 extends. The ends of the channel member 42 are closed by a flange 43 through which an opening is made. A nut and bolt 45 pivotally joins the lower end of the arm 26 to the flange 43 of the channel member. Centrally of and permanently joined to the channel member is a block 46. A drilled and tapped horizontal opening 47 is made in both the channel and block 46, the rod 32 being engaged therewith substantially as shown in Figure 2.

Attention is directed to the fact that the structure above described is such that the mirror frame 15, by rotating the knob 33, may be caused to move forwardly or backwardly as desired. It will also be noted that the mirror frame cannot be tilted manually but needs be operated by the rod 32 for the reason that the threaded portion 40 of the rod and the block 46 constitute a worm and gear structure which prevents such manipulation.

The modified supporting member 48, shown in Figure 4, of the drawing, is comprised of fixed and movable elements 49 and 50, similar to the structure above described. In this instance, however, the fixed element is provided with a flange 51 which engages the edge of the article of furniture and thus assists in locating the supporting member on the article. The movable element 50, by reason of the additional up turned flange 52, provides a pocket 53 in which the frame 15 is mounted. The rear flange 54 and arm 55 are identical with that described in the previous modification.

The further modification shown in Figure 5, is most applicable in instances where it is desired to support only an extremely light mirror and frame. This supporting member 56 is in the form of a conventional hinge, the upper movable element 57 of which has extending downwardly therefrom, the actuating arm 58. It will be noted that in this modification the forward tilting of the mirror frame is somewhat limited whereas in the modifications shown in Figures 2 and 4, the rearward tilting of the mirror is limited.

While applicant has shown but three modifications of his invention as applied to adjustably support a mirror frame upon an article of furniture, it is obvious that other modifications or adaptations may be made without departing from the spirit and scope of the invention as set forth in the hereunto annexed claims.

Having thus set forth my invention what I claim as new and for which I desire protection by Letters Patent is:

1. A device for adjustably supporting a mirror on an article of furniture comprising a pair of pivotally joined fixed and movable elements, said fixed element being mounted on the outside of said article of furniture, flanges on said movable element engaged with the frame of and supporting said mirror, a rotatable rod mounted in said article, a channel member threadedly engaging with said rod, and means linking said channel member with said movable element whereby rotation of said rod causes said mirror to be tilted forwardly or backwardly.

2. A device for adjustably supporting a mirror on an article of furniture, comprising a pair of fixed and movable pivotally connected elements, said fixed element being attached to the outside of said article, flanges on said movable element engaged with and adapted to support said mirror, an arm projecting downwardly from said movable element, a horizontal channel member pivotally connected with said arm and a rod threadably engaged with said channel member, whereby rotation of said rod causes said mirror to be tilted forwardly or backwardly.

3. An end pivot support and adjuster for mounting a mirror on an article of furniture comprising a pair of fixed and movable pivotally connected elements, flanges on said movable element engaged with and supporting said mirror, said fixed element being attached to said article of furniture, a rotatable rod mounted in and extending beyond the front and rear walls of said article of furniture, a knob secured to the forward end of said rod, a channel member threadably engaged with the rearward end of said rod and an arm on said movable element pivotally connected with said channel member whereby said mirror may be tilted forwardly or backwardly by the rotation of said knob.

In testimony whereof I have affixed my signature.

GUST C. PETERSON.